Dec. 15, 1925.
A. RAFINER
1,565,394
BEVELING AND SQUARING TOOL
Filed Sept. 24, 1923
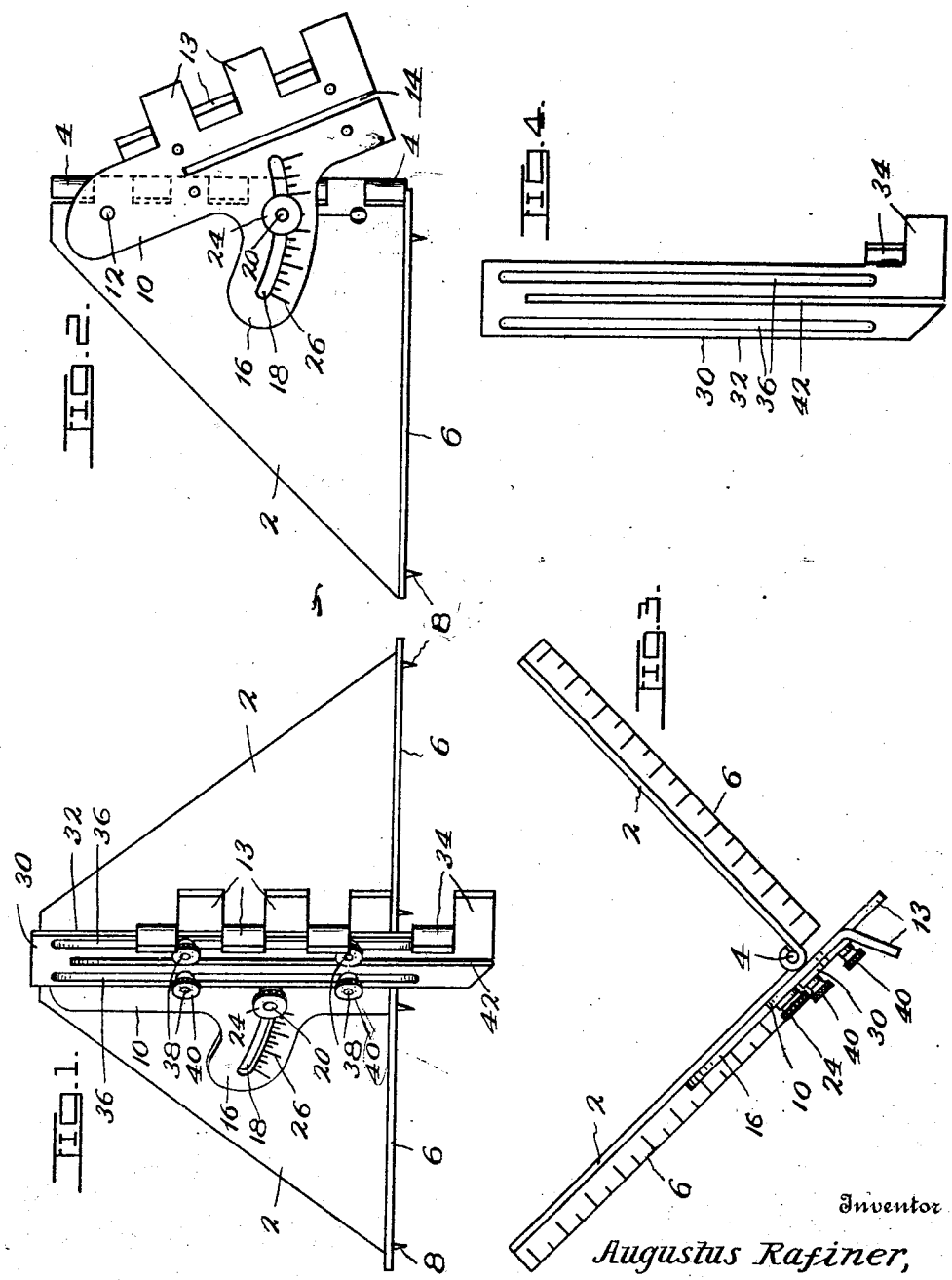
Inventor
Augustus Rafiner,
By F. G. Fischer,
Attorney.
Witness:
Fred C. Fischer, Patented Dec. 15, 1925.

1,565,394

UNITED STATES PATENT OFFICE.

AUGUSTUS RAFINER, OF KANSAS CITY, MISSOURI.

BEVELING AND SQUARING TOOL.

Application filed September 24, 1923. Serial No. 664,422.

*To all whom it may concern:*

Be it known that I, AUGUSTUS RAFINER, a citizen of the United States, residing at Kansas City, in the county of Jackson and State of Missouri, have invented certain new and useful Improvements in Beveling and Squaring Tools, of which the following is a specification.

My invention relates to a new and useful tool for the use of carpenters, machinists and other mechanics and one object is to provide a device embodying adjustable guide means for accurately guiding a drill bit at any desired angle through a block or other article being drilled.

A further object is to provide adjustable guide means for accurately directing a hand-saw at any desired angle through a plank or other article being sawed.

Another object is to provide a device of this character which may be folded into small compass, so that it can be readily carried in a tool box.

Other objects will hereinafter appear and in order that the invention may be fully understood, reference will now be had to the accompanying drawing, in which:

Fig. 1 is an elevation of the device set up with the tool guides in perpendicular position.

Fig. 2 is a side elevation of the device set up for use with one of the tool guides removed and the other adjusted at an angle to the perpendicular.

Fig. 3 is a plan view projected from Fig. 1.

Fig. 4 is a detail perspective view of the removable tool guide.

In carrying out the preferred form of the invention, I provide a pair of members 2, preferably, in the form of triangular plates connected at their vertical margins by a hinge 4, so that they may be swung apart to support each other as disclosed by Figs. 1 and 3, or folded against each other so as to occupy but little space.

Flanges 6, extending at right angles to the lower margins of the members 2, are provided to assist in supporting the latter in upright position and also to provide a scale whereby measurements may be taken, the flanges 6 being suitably graduated for that purpose as shown by Fig. 3. The flanges 6 are provided at their undersides with downwardly extending spurs 8 adapted to enter a wooden beam or plank and prevent the device from slipping about after being properly positioned.

10 designates a main tool guide adjustably connected at its upper end by a pivot 12 to one of the members 2. The front margin of the guide 10 is provided with alternately arranged fingers 13 extending at an angle to each other as shown by Figs. 1 and 2, to form a trough-like support or guide for a drill bit or other boring tool. The guide 10 is also provided with a longitudinal slot 14 for guiding a hand-saw at any angle within the scope of adjustment of said guide 10.

The rear margin of the guide 10 is provided with a segment 16 having an arcuate slot 18 struck from the axis of the pivot 12 and through which a screw 20 projects. The screw 20 is fixed to the adjacent member 2 and provided with a thumb nut 24 adapted to be screwed firmly against the segment 16 and thus reliably hold the guide 10 in the desired position. The segment 16 is provided with a scale 26 to enable the operator to set the guide 10 either perpendicularly or at any desired angle thereto within the range of the slot 18.

When a boring tool is used which is too long to be accurately directed by the fingers 13 of the relatively short guide 10, I provide an extensible guide member 30, Figs. 1 and 4. Said extensible guide member 30 consists of a bar 32 provided at its lower portion with two fingers 34, which extend at the same angles as the fingers 13 of the main guide 10. The bar 32 has longitudinal slots 36 through which screws 38 project from the main guide 10. The screws 38 are provided with thumb nuts 40 adapted to be screwed up against the extensible member 30 to firmly hold the same after being longitudinally adjusted on the guide 10. The extensible member 30 has a longitudinal slot 42 which registers with the slot 14 and constitutes a guide for a hand-saw when sawing a plank or block on a lower level than the flanges 6 of the members 2.

From the foregoing description it will be understood that I have provided a tool embodying the advantages above pointed out, and while I have shown and described the preferred construction, combination and arrangement of parts, I reserve the right to make such changes as properly fall within the spirit and scope of the appended claims.

Having thus described my invention, what

I claim and desire to secure by Letters Patent, is:

1. A device of the character described consisting of two elements operably connected together at adjacent margins so that they may be folded against each other or adjusted to support each other in upright position, a slotted tool guide pivoted on one of said elements and adapted to guide a tool at any desired angle to the face of an article on which the device is placed, a graduated segment projecting from said tool guide, and means carried by the element on which the tool guide is pivoted for locking said segment to said element.

2. A device of the character described consisting of two elements operably connected together at adjacent margins so that they may be folded against each other or adjusted to support each other in upright position, graduated flanges projecting at right angles from the lower margins of said elements, spurs depending from said flanges, and an adjustable tool guide mounted on one of said elements and adapted to guide a tool at different angles to the face of an article on which the device is placed.

3. A device of the character described consisting of two triangular plates hinged to fold against each other or be extended, and a tool guide pivotally mounted on one of said plates to guide a tool at different angles to the face of an article on which the device is placed.

In testimony whereof I affix my signature.

AUGUSTUS RAFINER.